United States Patent
Sallee

(10) Patent No.: US 12,450,788 B2
(45) Date of Patent: Oct. 21, 2025

(54) COUNTER-AI CAMOUFLAGE

(71) Applicant: Raytheon Company, Arlington, VA (US)

(72) Inventor: Philip A. Sallee, South Riding, VA (US)

(73) Assignee: Raytheon Company, Arlington, VA (US)

( * ) Notice: Subject to any disclaimer, the term of this patent is extended or adjusted under 35 U.S.C. 154(b) by 322 days.

(21) Appl. No.: 18/059,046

(22) Filed: Nov. 28, 2022

(65) Prior Publication Data

US 2024/0177368 A1    May 30, 2024

(51) Int. Cl.
   *G06T 11/00*      (2006.01)
   *G06V 10/764*    (2022.01)
   *G06V 10/774*    (2022.01)
   *G06V 10/776*    (2022.01)
   *G06V 10/82*     (2022.01)

(52) U.S. Cl.
   CPC .......... *G06T 11/001* (2013.01); *G06V 10/764* (2022.01); *G06V 10/774* (2022.01); *G06V 10/776* (2022.01); *G06V 10/82* (2022.01)

(58) Field of Classification Search
   CPC .... G06V 10/82; G06V 10/776; G06V 10/774; G06V 10/764; G06T 11/001
   See application file for complete search history.

(56) References Cited

PUBLICATIONS

Alexander Schwegmann "Camouflage methods to counter artificial intelligence recognition (Conference Presentation)", Proc. SPIE 12270, Target and Background Signatures VIII, 1227005 (Nov. 2, 2022); https://doi.org/10.1117/12.2638485 (Year: 2022).*

Alcorn, Michael & Li, Qi & Gong, Zhitao & Wang, Chengfei & Mai, Long & Ku, Wei-Shinn & Nguyen, Anh. (2019). Strike (With) a Pose: Neural Networks Are Easily Fooled by Strange Poses of Familiar Objects. 4840-4849. 10.1109/CVPR.2019.00498. (Year: 2019).*

Talas L, Fennell JG, Kjernsmo K, Cuthill IC, Scott-Samuel NE, Baddeley RJ. CamoGAN: Evolving optimum camouflage with Generative Adversarial Networks. Methods Ecol Evol. 2020;11(2):240â7. (Year: 2020).*

Adhikari, Ajaya, et al., "Adversarial Patch Camouflage Against Aerial Detection", Proc. SPIE 11543, Artificial Intelligence and Machine Learning in Defense Applications II, 115430F, (Sep. 20, 2020), 9 pgs.

(Continued)

*Primary Examiner* — John R Wallace
(74) *Attorney, Agent, or Firm* — Schwegman Lundberg & Woessner, P.A.

(57) ABSTRACT

Embodiments regard generating patterns that provide security from detection by artificial intelligence (AI) detection systems. A method includes generating, by a pattern generator, an image of camouflage, altering, by a camouflage painter, pixel values of a first target object in an image of the first target object to be consistent with the image of camouflage resulting in an image of a camouflaged target, concurrently determining (i) by a critic network, whether the image of the camouflaged target includes camouflage and (ii) by a target classifier whether the image of the camouflaged target includes the target object, and training the pattern generator to concurrently fool the critic network and the target classifier based on a combination of a loss of the critic network and a loss of the target classifier.

17 Claims, 6 Drawing Sheets

(56) References Cited

PUBLICATIONS

Duan, Ranjie, et al., "Adversarial Camouflage: Hiding Physical-World Attacks With Natural Styles", Conference: 2020 IEEE/CVF Conference on Computer Vision and Pattern Recognition (CVPR), (Jun. 2020), 9 pgs.

Talas, Laszlo, et al., "CamoGAN: Evolving optimum camouflage with Generative Adversarial Networks", Methods Ecol Evol. vol. 11, Issue 2, (Feb. 2020), 240-247.

Zhang, Yang, et al., "Camou: Learning a Vehicle Camouflage for Physical Adversarial Attack on Object Detectors in the Wild", ICLR 2019 Conference, (Sep. 27, 2018), 20 pgs.

* cited by examiner

COUNTER-AI CAMOUFLAGE

TECHNICAL FIELD

Embodiments provide camouflage patterns that can be painted on an object or applied to an image of an object to defeat an object recognition system.

BACKGROUND

A prior approach for counter-artificial intelligence (AI) camouflage of remotely sensed objects applies brightly colored patches that are not practical for real-world camouflage of military targets. The patches of the prior approach are highly detectable by humans (and probably machines as well, if trained to detect them). Another approach adapts adversarial patterns using ad-hoc style, transfer and smoothness loss terms to generate patterns that are trained to minimize visibility.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Because the latter approach discussed in the Background does not use a generative adversarial network (GAN) with a critic network that is allowed to learn to defeat the camouflage, the network generated may be more vulnerable to supervised attacks. Other various methods for generating real-world adversarial patches and counter-AI camouflage to avoid object detection do not address the visibility or detection of the camouflage pattern. For example, a GAN solution for evolving optimum camouflage does not learn counter-AI patterns, as it does not train against a static object detection network and the generated patterns are embedded within natural texture backgrounds rather than "painted" on objects.

Embodiments use a generative adversarial network (GAN) to train a pattern generator. A goal of the pattern generator can be to simultaneously confuse both 1) a detector network (sometimes called a "target classifier") previously trained to detect specific objects to be camouflaged, and 2) a critic network that is trained concurrently with the generator to detect the camouflage. Camouflage is a pattern applied to an exterior of an object. During training, patterns from the pattern generator are applied to objects as simulated paint according to segmentation mask labels. The simulated paint can be applied to a real object or an image of an object. An object (whether real or an image of the object) with the simulated paint applied thereto is sometimes called a camouflaged object.

Improvements provided by embodiments can include: (i) a GAN architecture that combines two types of adversarial networks against a pattern generation network: (a) an object detection network that is not trained against the camouflage, and (b) a critic network that is actively trained against the camouflage; (ii) augmentation of the generated patterns within the GAN, using translation, scale, rotation, etc.; (iii) a simulated painting of objects within the GAN with the generated patterns; (iv) a weighted loss function that combines the adversarial loss from both an object detector and a critic; (v) an automatic adjustment of the weighted loss based on the relative average detection loss from both adversarial networks; or a combination thereof, among others.

Figure 1:
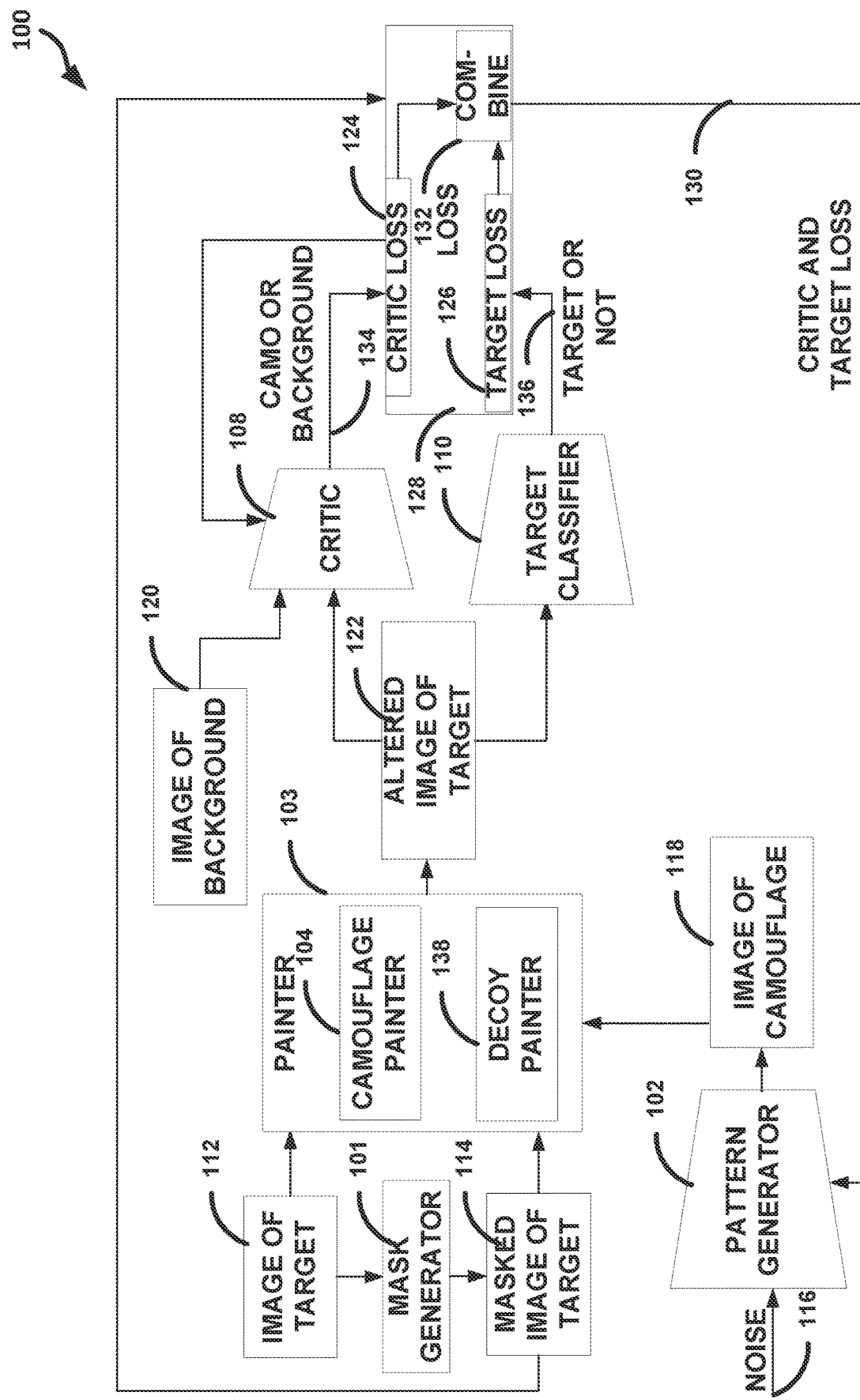
FIG. 1 illustrates, by way of example, a diagram of an embodiment of a system for counter-AI camouflage generation.

FIG. 1 illustrates, by way of example, a diagram of an embodiment of a system 100 for counter-AI camouflage generation. The system 100 pits a pattern generator 102 against both of a critic network 108 and a target classifier 110 concurrently. The pattern generator 102 attempts to generate a pattern that, when applied to an object (sometimes called a "target") causes the critic network 108 to indicate that no camouflage is present and, concurrently, the target classifier 110 to indicate that the target is not present in the image. In this way, the pattern generator 102 can generate camouflage that is not detected by a camouflage detector (e.g., the critic network 108) and also works to hide the target from detection (e.g., by the target classifier 110).

The pattern generator 102 is a neural network (NN) that generates an image of camouflage 118 based on noise 116. The pattern generator 102 is a convolutional NN that is trained based on a combination of critic and target loss 130. The loss 130 is configured to cause the pattern generator 102 to generate a pattern that, when applied to a target, is not detected as camouflage and is concurrently not detected as the target. The image of the camouflage 118 is a configurable size, color spectrum, and the like. The image of the camouflage 118 can be used by a camouflage painter 104 to apply the camouflage in the image of the camouflage 118 to the target.

A painter 103 can include one or more of a camouflage painter 104 or a decoy painter 138. The camouflage painter 104 can receive a masked image of a target 114 from a mask generator 101, an image of the target 112, and the image of the camouflage 118. The image of the target 112 is an image of a real target. The image of the target 112 can be an overhead image generated by a satellite or other airborne platform or a ground image, generated by a person on the ground or ground platform. The image can be of any sensor modality include electro-optical (EO), spectral, multi-spectral, infrared (IR), radar, a combination thereof, or the like. The target is any object that can be identified by the target classifier 110. Example objects include people, faces, a vehicle, such as a truck, car, tank, ship or other watercraft, an airplane or other aircraft, a structure, such as a landmark, building, road, bridge, tower, infrastructure or the like, among other objects. The decoy painter 138 can receive an image that does or does not include the target and generate a target in the received image.

The masked image of the target 114 includes the image of the target 112 altered such that pixels of the target in the image of the target 112 are set to a specified value and all other pixels are set to a different specified value or remain unchanged. The masked image of the target 114 can be generated by providing the image of the target 114 as input to the target classifier 110 (or a different classifier). The target classifier 110 can indicate which pixels of the image of the target 114 correspond to the target.

The camouflage painter 104 alters one or more color values of one or more pixels of the image of the target 112. The one or more pixels are those pixels that are set to the specified value in the masked image of the target 114. In other words, the one or more pixels are those pixels of the image of the target 112 that are associated with the target in the masked image of the target 114. The alteration of the one or more pixels performed by the camouflage painter 104 can be based on the image of camouflage 118. The pixel values from the image of camouflage 118 can be applied, either exactly or after consideration of image characteristics, to the one or more pixels of the image of the target 112 that are associated with the target (sometimes called "target pixels").

In some embodiments the decoy painter 138 can generate one or more decoy objects in the altered image of the target 122. The target, in the altered image of the target 122 can be a decoy target, a camouflaged target, or a combination thereof. The decoy objects can take the form of the target and include same or different camouflage than the camouflage used on non-decoy targets (actual targets). An example of a decoy object is provided in FIG. 3. The loss for the target classifier 110 (the target loss), the critic network 108 (the critic loss), or a combination thereof, can be adjusted to account for the desired detection of the decoy object. That is, it is desired to have the target classifier 110, the critic network 108, or a combination thereof, detect the decoy and not detect the actual camouflaged target(s) in the altered image of the target 122. Thus, the loss can be configured to adjust parameters of the corresponding classifier or network for (i) detecting an actual camouflaged target, (ii) not detecting the decoy object, or a combination thereof.

Image characteristics that can be used to alter the one or more pixel values before they are applied to the target pixels can include luminance, specular, reflection, shadow, opacity, feature size, among others. The pixel values of the image of camouflage 118 can be altered based on the one or more characteristics, such that the camouflage, when applied to the image, results in an image of a camouflaged target 122.

The altered image of the target 122 includes the pixel values of the image of camouflage 118 (e.g., altered in accord with the image characteristics) in place of pixel values of the target in the image of the target 112, a decoy target from the decoy painter 138, or a combination thereof. By altering the pixel values in the image of camouflage 118 in accord with the image characteristics, the camouflage 118 or decoy can appear more natural in the setting of the image of the target 112 around the target.

An example of altering the image of the camouflage in accord with the image characteristics includes considering luminance. Luminance considerations include intensity and shadow, among others. In considering luminance, the pixels from the image of camouflage 118 can be adjusted, in terms of pixel color value, to better match a mean pixel value of the target. The matching can be relative to a maximum intensity value in the image of the target 122. For example, a luminance value can be set to an average of the pixel values divided by the maximum pixel value. Then, the luminance value can be used as a weight for each of the pixels in the image of the camouflage 118.

The image of the background 120 includes a portion of the image of the target 112 that does not include the target 112. The image of the background 120 can be a subset of the image of the target 112 that does not include any portion of the target. Note that the image of the background 120 is optional and may not be used, such as when the critic network 108 is a segmentation model (e.g., provides a pixel-wise classification).

The critic network 108 receives the image of the camouflaged target 122 from the camouflage painter 104 for classification. The critic network 108 optionally receives the image of the background 120 for further training. The critic network 108 determines whether (e.g., pixel by pixel) the image contains a camouflaged target that is distinguishable from the background. The critic network 108 thus provides an output 134 indicating (e.g., for each pixel of the image of the camouflaged target) whether the image or pixel corresponds to camouflage or background. The output 134 of the critic network 108 can be converted to a critic loss 124, by a loss operator 128, based on the masked image of the target 114. The critic loss 124 is used to further train the pattern generator 102 and the critic network 108.

The target classifier 110 analyzes the image of the camouflaged target 122 to determine (e.g., per pixel) whether respective types of objects are present in the image of the camouflaged target 122. The output 136 of the target classifier 110 thus indicates whether the camouflaged image of the target 114 includes any instances of any of the targets recognized by the target classifier 110. A target loss 126 for training the pattern generator 102 (not for training the target classifier 110) can be determined based on the output 136 of the target classifier 110 and the masked image of the target 114.

The critic loss 124 or the target loss 126 can include a cross-entropy loss, either binary or categorical cross-entropy depending on the target labels, mean squared error (MSE), Wasserstein loss, or the like. The combined loss 128 for the pattern generator 102 can penalize small losses for the critic network 108 and target classifier 110, (e.g., the combined loss 128 can be composed using the negative of the critic loss 124 and target loss 126).

The goal of the pattern generator 102 is to convince the target classifier 110 that the object that is camouflaged is not present and simultaneously convince the critic network 108 that no camouflage is present. Thus, a loss operator 128 can combine, by combine operator 132, the critic loss 124 and the target loss 126. The combine operator 132 can mathematically combine the critic loss 124 and the target loss 126 and provide a combined loss 130 to the pattern generator 102. The mathematical combination can reflect a balance between correcting for fooling the critic network 108 and for fooling the target classifier 110. The combined loss 130 can be, for example, a weighted combination of the critic loss 124 and the target loss 126. A higher relative weight on either of the critic loss 124 and the target loss 126 indicates a higher relative importance for fooling the critic network 108 and the target classifier 110, respectively. In some embodiments, the combined loss 130 can be determined based on (i) an average of the critic loss 124 and (ii) an average of the target loss 126. The weight for the critic loss 124 can be determined as an average of the target loss 126 divided by a sum of (i) the average of the critic loss 124 and (ii) the average of the target loss 126. The average can be over all time, a specified number of epochs (e.g., 10, 100, 1000, a greater or lesser number or some number therebetween), or the like. The weights for the critic loss 124 and the target loss 126 can sum to a specified number, such as one (1). Thus, if the critic loss 124 is x, then the target loss 126 is (1−x).

Figure 2:
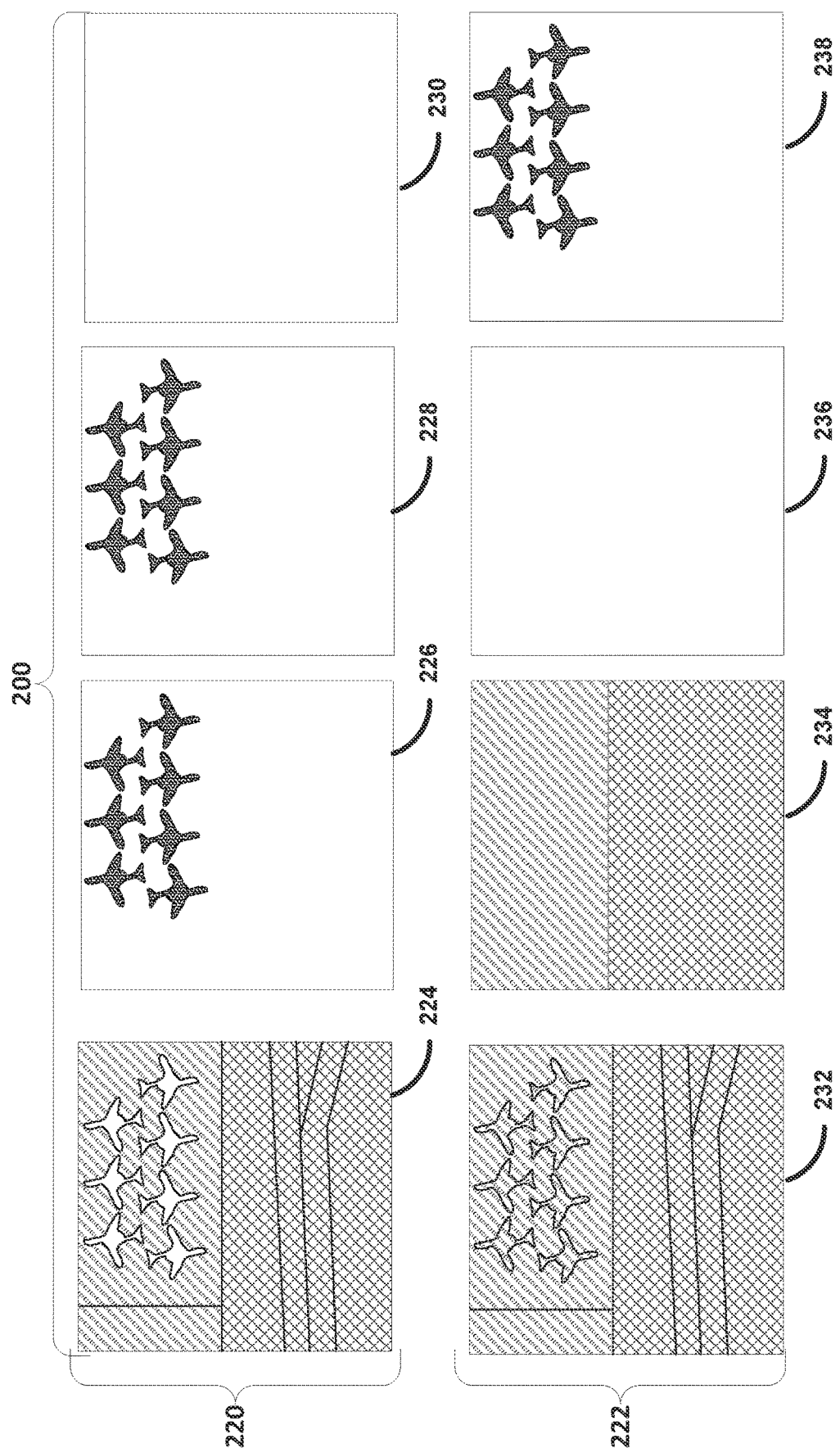
FIG. 2 illustrates, by way of example, a diagram of various outputs from components of the system of FIG. 1.

FIG. 2 illustrates, by way of example, a diagram of various outputs 200 from components of the system 100. Each of the illustrated outputs in FIG. 2 are images. Such images can be generated by segmentation classifiers that generate an output per pixel. The outputs 200 as illustrated include outputs 220 generated based on real images and outputs 222 generated based on camouflaged images.

The outputs 220 include a real image 224, a masked image 226, output 228 of the target classifier 110 based on the real image 224 as input, and output 230 of the critic network 108 based on the real image 224 as input. The real image 224 is an example of the image of the target 112. The masked image 226 is an example of the masked image of the target 114. The target classifier 110 detects all of the target objects in the image as indicated by the output 228. The critic network 108 correctly indicates that no camouflage is present in the image 224 as indicated by the output 230.

The outputs 222 include an image with a camouflaged target 232, a camouflage pattern 234, output 236 of the target classifier 110 using the image with the camouflaged target 232 as input, and output 238 of the critic network 108 using the image with the camouflaged target 232 as input. The camouflage pattern 234 is similar to the background of the image 224 around the target. This is due to the critic network 108 being trained to distinguish between the background (image of the background 120) and the camouflage (image of the camouflaged target 122). As can be seen, in the example provided in FIG. 2, the critic network 108 can detect the camouflage as indicated by the output 238 but the target classifier 110 is unable to detect the target as indicated by the output 236. To help fool the critic network 108, the loss operator 128 can weight the critic loss 124 higher than the target loss 126 in the combined loss 130. Then, the pattern generator 102 can be further trained based on the combined loss 130 to improve its ability to fool the critic network 108.

Figure 3:
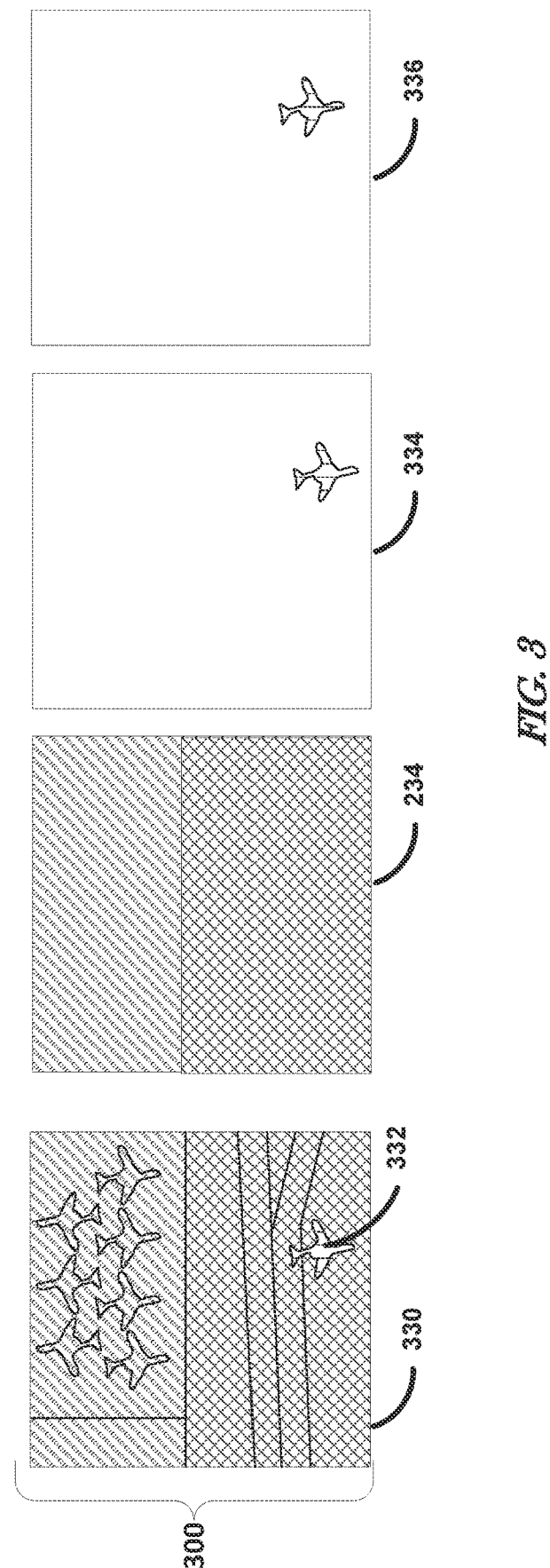
FIG. 3 illustrates, by way of example, a diagram of more various outputs from components of the system.

FIG. 3 illustrates, by way of example, a diagram of more various outputs 300 from components of the system 100. An output 330 of the painter 103 (an example of the image of the camouflaged target 122) includes a decoy object 332. The background image 234 is the same as in FIG. 2. The target classifier 110 and the critic network 108 produce respective outputs 334, 336 based on the output 330. The target classifier 110 and the critic network 108 are both fooled into recognizing the decoy object 332 and fooled into not recognizing any of the actual objects. The decoy object 332 can be situated so as to be non-overlapping with any actual targets in the image. The decoy object 332 can be situated a specified number of pixels from any targets in the image. Such configurations provide a measure of protection for the actual targets.

Figure 4:
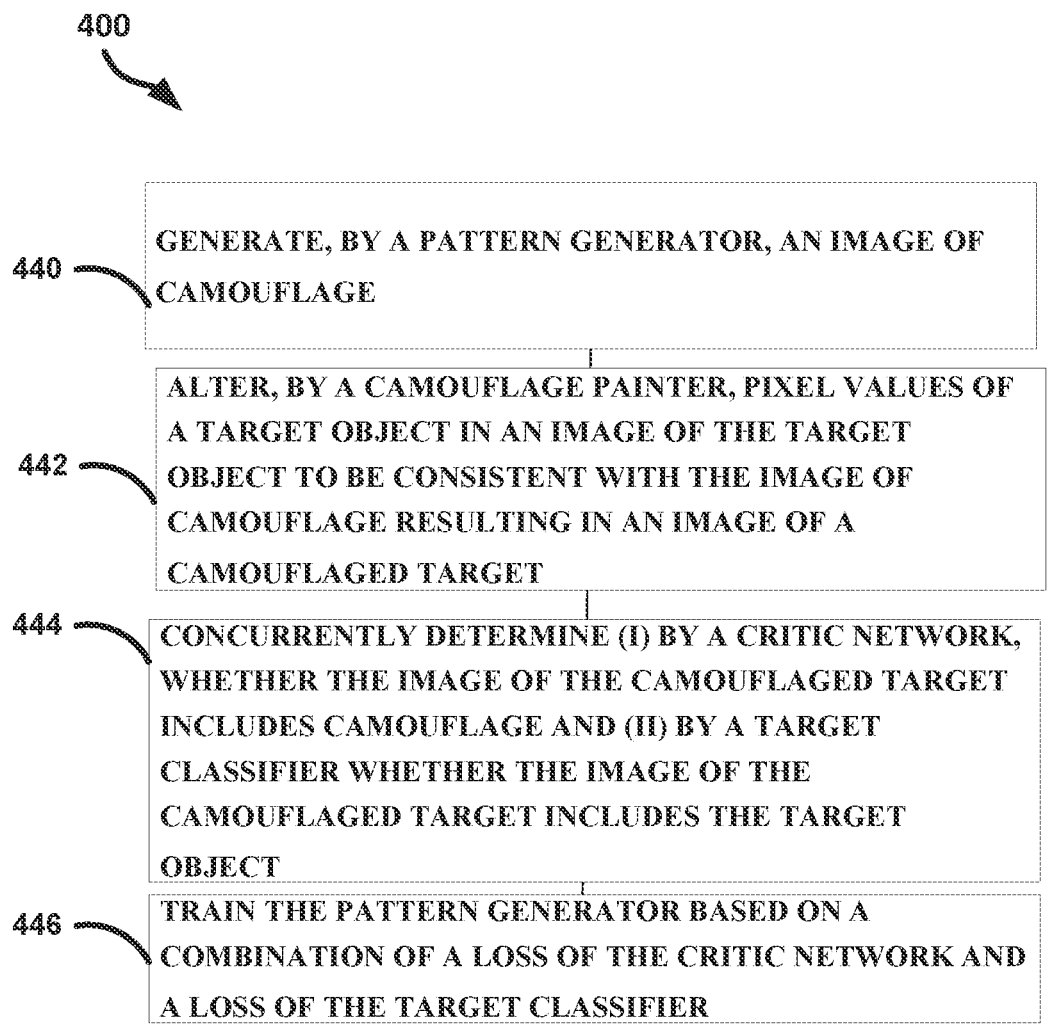
FIG. 4 illustrates, by way of example, a diagram of an embodiment of a method for counter-AI camouflage generation.

FIG. 4 illustrates, by way of example, a diagram of an embodiment of a method 400 for counter-AI camouflage generation. The method 400 as illustrated includes generating, by a pattern generator trained to concurrently fool a critic network and a target classifier, an image of camouflage, at operation 440; altering, by a camouflage painter, pixel values of a target object in an image of the target object to be consistent with the image of camouflage resulting in an image of a camouflaged target, at operation 442; concurrently determining (i) by the critic network, whether the image of the camouflaged target includes camouflage and (ii) by the target classifier whether the image of the camouflaged target includes the target object, at operation 444; and training the pattern generator based on a combination of a loss of the critic network and a loss of the target classifier, at operation 446.

The method 400 can further include, wherein the combination of the loss of the critic network and the loss of the target classifier includes a weighted combination of the loss of the critic network and the loss of the target classifier. The method 400 can further include, wherein the weight of the loss of the critic network is determined based on an average loss of the target classifier and an average loss of the critic network. The method 400 can further include, wherein the weight of the loss of the critic network is determined based on the average loss of the target classifier and a sum of the average loss of the target classifier and the average loss of the critic network.

The method 400 can further include, wherein altering pixel values of the target object in the image of the target object includes altering the pixel values based on one or more image characteristics of the image of the target object. The method 400 can further include, wherein the image characteristic is luminance. The method 400 can further include augmenting the image of the camouflage using translation, scale, or rotation of the image of the camouflage.

Artificial Intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as object recognition, device behavior modeling (as in the present application) or the like. The pattern generator 102, camouflage painter 104, decoy painter 138, critic network 108, target classifier 110, or other component or operation can include or be implemented using one or more NNs.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights.

In some examples, initial weights may be randomly selected. Training data is fed into the NN, and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 5:
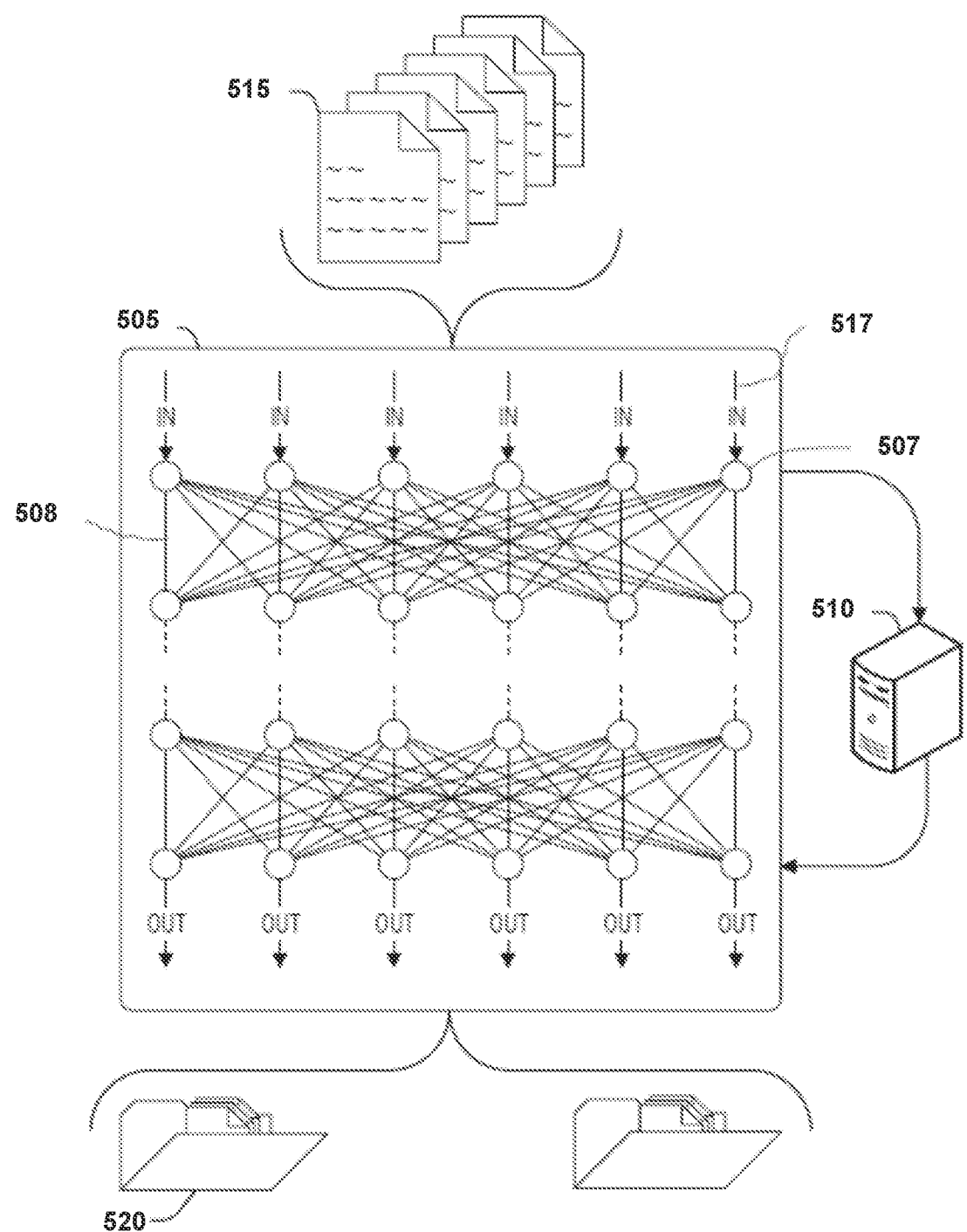
FIG. 5 is a block diagram of an example of an environment including a system for neural network training.

FIG. 5 is a block diagram of an example of an environment including a system for neural network training. The system includes an artificial NN (ANN) 505 that is trained using a processing node 510. The processing node 510 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 505, or even different nodes 507 within layers. Thus, a set of processing nodes 510 is arranged to perform the training of the ANN 505.

The set of processing nodes 510 is arranged to receive a training set 515 for the ANN 505. The ANN 505 comprises a set of nodes 507 arranged in layers (illustrated as rows of nodes 507) and a set of inter-node weights 508 (e.g., parameters) between nodes in the set of nodes. In an example, the training set 515 is a subset of a complete training set. Here, the subset may enable processing nodes with limited storage resources to participate in training the ANN 505.

The training data may include multiple numerical values representative of a domain, such as an image feature, or the like. Each value of the training or input 517 to be classified after ANN 505 is trained, is provided to a corresponding node 507 in the first layer or input layer of ANN 505. The values propagate through the layers and are changed by the objective function.

As noted, the set of processing nodes is arranged to train the neural network to create a trained neural network. After the ANN is trained, data input into the ANN will produce valid classifications 520 (e.g., the input data 517 will be assigned into categories), for example. The training performed by the set of processing nodes 507 is iterative. In an example, each iteration of the training the ANN 505 is performed independently between layers of the ANN 505. Thus, two distinct layers may be processed in parallel by different members of the set of processing nodes. In an example, different layers of the ANN 505 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 507 (e.g., neurons) are trained independently. In an example, the nodes are trained on different hardware.

Figure 6:
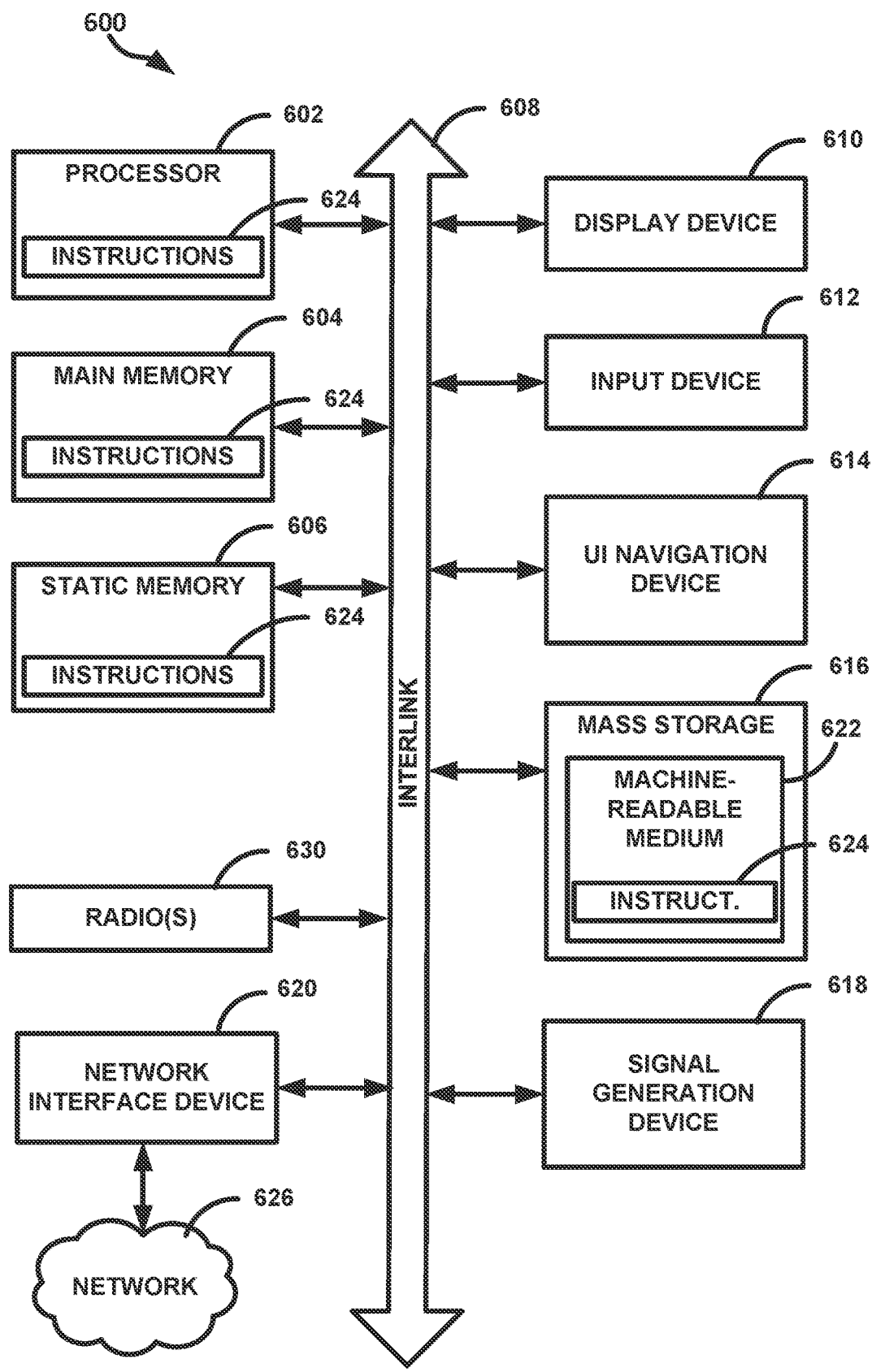
FIG. 6 illustrates, by way of example, a block diagram of an embodiment of a machine in the example form of a computer system within which instructions, for causing the machine to perform any one or more of the methods discussed herein, may be executed.

FIG. 6 illustrates, by way of example, a block diagram of an embodiment of a machine in the example form of a computer system 600 within which instructions, for causing the machine to perform any one or more of the methods discussed herein, may be executed. One or more of the mask generator 101, pattern generator 102, camouflage painter 104, critic network 108, target classifier 110, loss operator 128, decoy painter 138, or other device, component, operation, or method discussed can include, or be implemented or performed by one or more of the components of the computer system 600. In a networked deployment, the machine may operate in the capacity of a server or a client machine in server-client network environment, or as a peer machine in a peer-to-peer (or distributed) network environment. The machine may be a personal computer (PC), server, a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a mass storage unit 616, a signal generation device 618 (e.g., a speaker), a network interface device 620, and a radio 630 such as Bluetooth, WWAN, WLAN, and NFC, permitting the application of security controls on such protocols.

The mass storage unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices, magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTPS). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes a method for counter artificial intelligence (AI) camouflage, the method comprising generating, by a pattern generator trained to concurrently fool a critic network and a target classifier, an image of camouflage, altering, by a camouflage painter, pixel values of a target object in an image of the target object to be consistent with the image of camouflage resulting in an image of a camouflaged target, concurrently determining (i) by the critic network, whether the image of the camouflaged target includes camouflage and (ii) by the target classifier whether the image of the camouflaged target includes the target object, and training the pattern generator based on a combination of a loss of the critic network and a loss of the target classifier.

In Example 2, Example 1 further includes, wherein the combination of the loss of the critic network and the loss of the target classifier includes a weighted combination of the loss of the critic network and the loss of the target classifier.

In Example 3, Example 2 further includes, wherein the weight of the loss of the critic network is determined based on an average loss of the target classifier and an average loss of the critic network.

In Example 4, Example 3 further includes, wherein the weight of the loss of the critic network is determined based on the average loss of the target classifier and a sum of the average loss of the target classifier and the average loss of the critic network.

In Example 5, at least one of Examples 1-4 further includes, wherein altering pixel values of the target object in the image of the target object includes altering the pixel values based on one or more image characteristics of the image of the target object.

In Example 6, Example 5 further includes, wherein the image characteristic is luminance.

In Example 7, at least one of Examples 1-6 further includes, augmenting the image of the camouflage using translation, scale, or rotation of the image of the camouflage.

Example 8 includes a non-transitory machine-readable medium including instructions that, when executed by a machine, cause the machine to perform operations for counter artificial intelligence (AI) camouflage, the operations comprising the method of one of Examples 1-7.

Example 9 includes a system for counter artificial intelligence (AI) camouflage, the system comprising processing circuitry, a memory including instructions that, when executed by the processing circuitry, cause the processing circuitry to perform operations comprising the method of one of Examples 1-7.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instance or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for counter artificial intelligence (AI) camouflage, the method comprising:
generating, by a pattern generator, an image of camouflage;
altering, by a camouflage painter, pixel values of a first target object in an image of the first target object to be consistent with the image of camouflage resulting in an image of a camouflaged target;
concurrently determining (i) by a critic network, whether the image of the camouflaged target includes camouflage and (ii) by a target classifier whether the image of the camouflaged target includes the target object; and
training the pattern generator to concurrently fool the critic network and the target classifier based on a weighted combination of a loss of the critic network and a loss of the target classifier.

2. The method of claim 1, further comprising:
providing a camouflage, generated by the pattern generator, to apply to a second target object, said camouflage enabling the second target object to be potentially undetectable by the target classifier.

3. The method of claim 1, wherein the loss of the critic network is calculated based on the determining whether the image of the camouflaged target includes camouflage and the loss of the target classifier is calculated based on the determining whether the image of the camouflaged target includes the target object.

4. The method of claim 1, wherein the weight of the loss of the critic network is determined based on an average loss of the target classifier and an average loss of the critic network.

5. The method of claim 4, wherein the weight of the loss of the critic network is determined based on the average loss of the target classifier and a sum of the average loss of the target classifier and the average loss of the critic network.

6. The method of claim 1, wherein altering pixel values of the target object in the image of the target object includes altering the pixel values based on one or more image characteristics of the image of the target object.

7. The method of claim 6, wherein the one or more image characteristics includes luminance.

8. The method of claim 1, further comprising augmenting the image of the camouflage using translation, scale, or rotation of the image of the camouflage.

9. The method of claim 1, further comprising generating, by a decoy painter, a decoy object in an image.

10. A non-transitory machine-readable medium including instructions that, when executed by a machine, cause the machine to perform operations for counter artificial intelligence (AI) camouflage, the operations comprising:
generating, by a pattern generator, an image of camouflage;
altering, by a camouflage painter, pixel values of a target object in an image of the target object to be consistent with the image of camouflage resulting in an image of a camouflaged target;
concurrently determining (i) by a critic network, whether the image of the camouflaged target includes camouflage and (ii) by a target classifier whether the image of the camouflaged target includes the target object; and
training the pattern generator based on a weighted combination of a loss of the critic network and a loss of the target classifier.

11. The non-transitory machine-readable medium of claim 10, wherein the weight of the loss of the critic network is determined based on an average loss of the target classifier and an average loss of the critic network.

12. The non-transitory machine-readable medium of claim 11, wherein the weight of the loss of the critic network is determined based on the average loss of the target classifier and a sum of the average loss of the target classifier and the average loss of the critic network.

13. The non-transitory machine-readable medium of claim 10, wherein altering pixel values of the target object in the image of the target object includes altering the pixel values based on one or more image characteristics of the image of the target object.

14. The non-transitory machine-readable medium of claim 10, further comprising augmenting the image of the camouflage using translation, scale, or rotation of the image of the camouflage.

15. A system for counter artificial intelligence (AI) camouflage, the system comprising:
processing circuitry;
a memory including instructions that, when executed by the processing circuitry, cause the processing circuitry to perform operations comprising:
generating, by a pattern generator, an image of camouflage;
altering, by a camouflage painter, pixel values of a target object in an image of the target object to be consistent with the image of camouflage resulting in an image of a camouflaged target;
concurrently determining (i) by a critic network, whether the image of the camouflaged target includes camouflage and (ii) by a target classifier whether the image of the camouflaged target includes the target object; and
training the pattern generator based on a weighted combination of a loss of the critic network and a loss of the target classifier.

16. The system of claim 15, wherein the weight of the loss of the critic network is determined based on an average loss of the target classifier and an average loss of the critic network.

17. The system of claim 15, wherein altering pixel values of the target object in the image of the target object includes altering the pixel values based on one or more image characteristics of the image of the target object.

* * * * *